June 4, 1968 F. W. CORDS 3,386,777
AUXILIARY HYDRAULIC BRAKE LOCK
Filed June 2, 1967 3 Sheets-Sheet 1
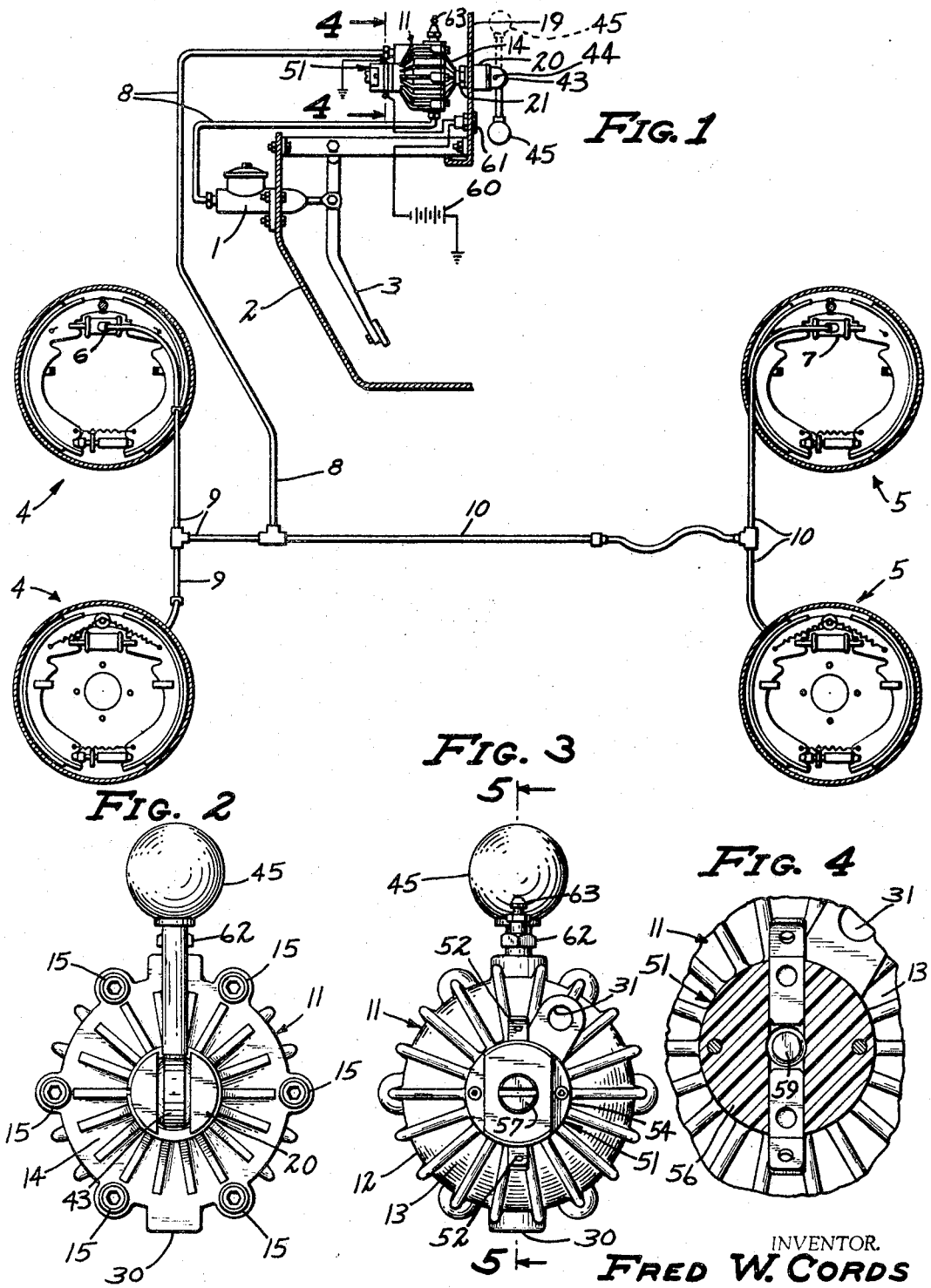
INVENTOR.
FRED W. CORDS
BY
Merchant & Gould
ATTORNEYS

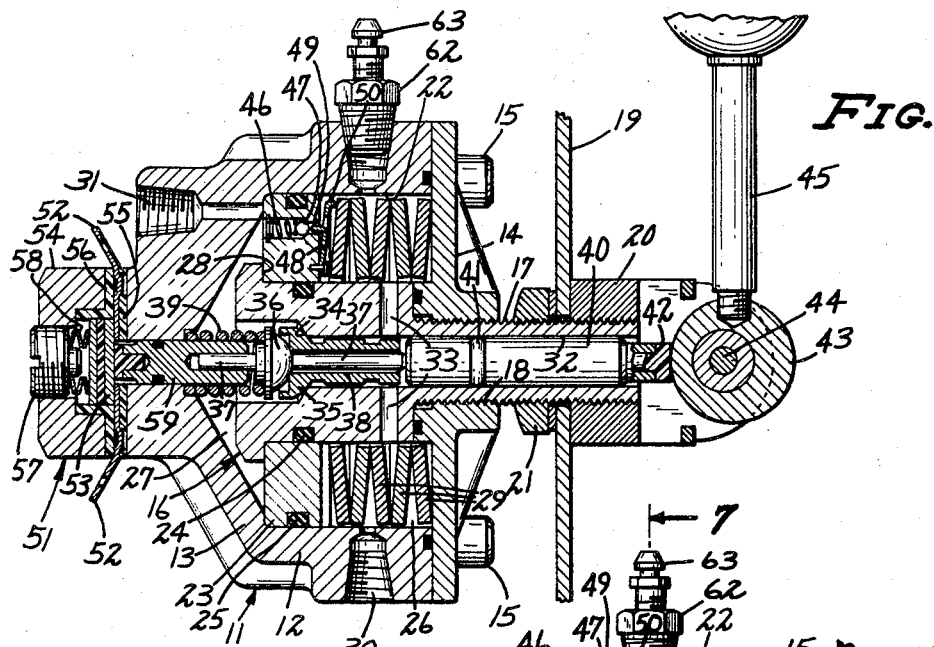
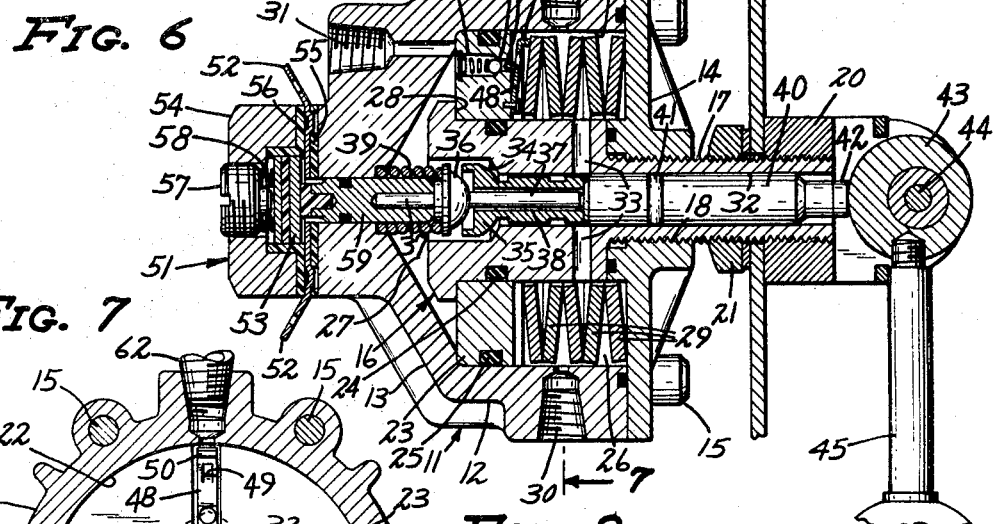
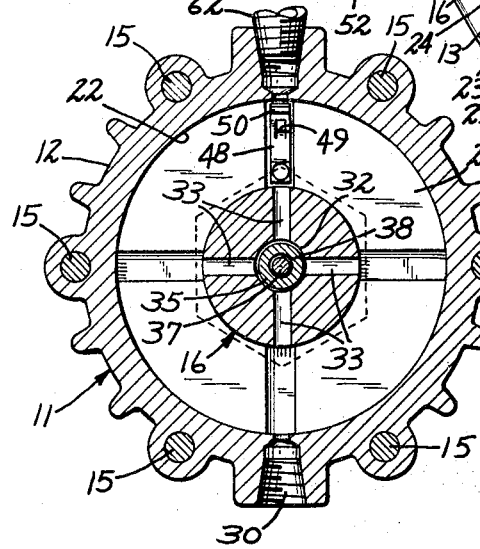
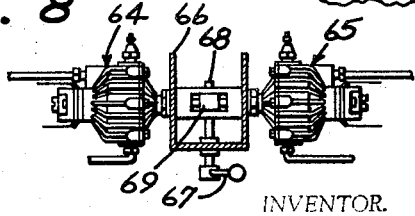
INVENTOR.
FRED W. CORDS
BY
Merchant & Gould
ATTORNEYS June 4, 1968 F. W. CORDS 3,386,777
AUXILIARY HYDRAULIC BRAKE LOCK
Filed June 2, 1967 3 Sheets-Sheet 3
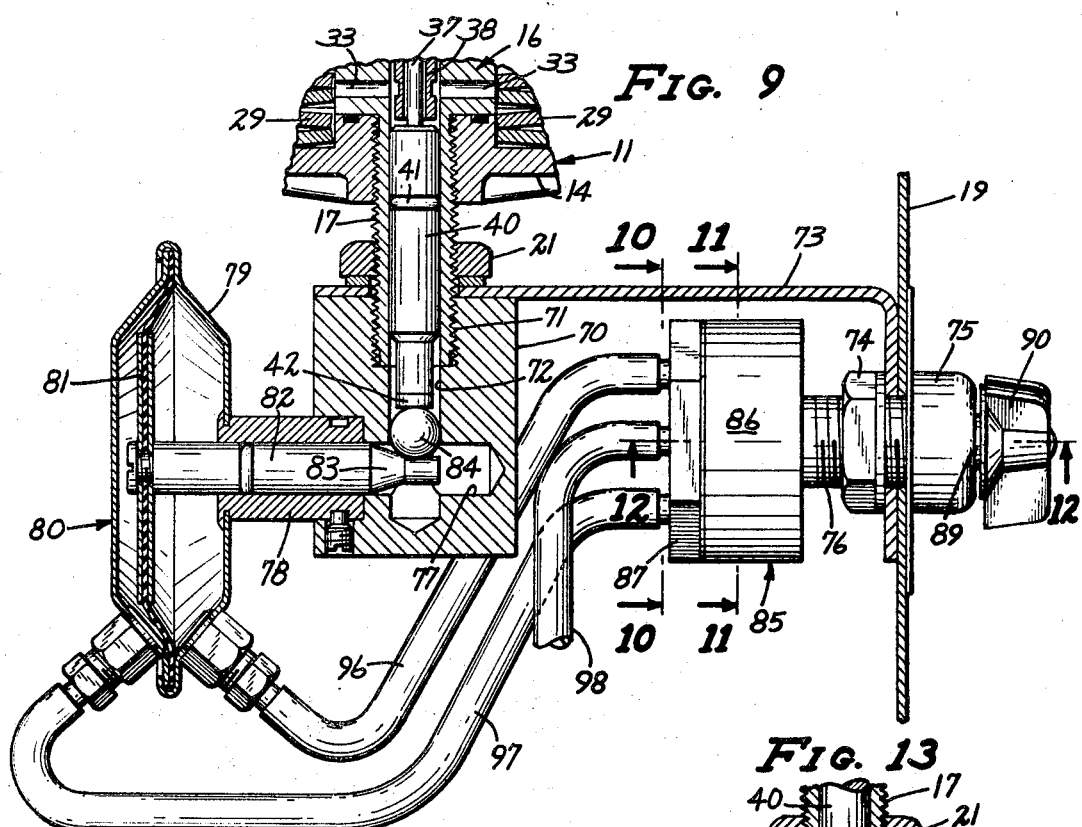
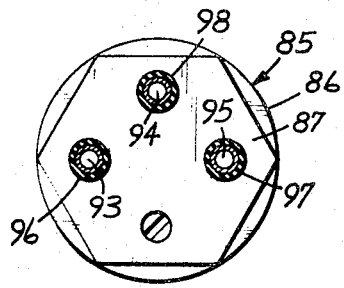
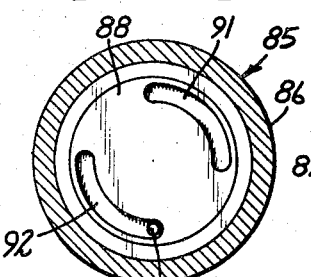
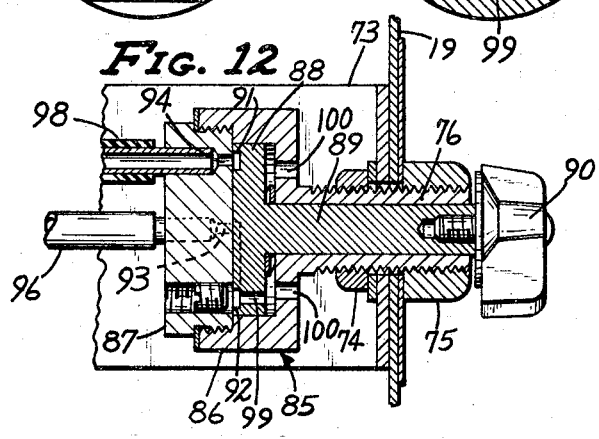
INVENTOR.
FRED W. CORDS
BY
Merchant & Gould
ATTORNEYS

United States Patent Office 3,386,777
Patented June 4, 1968

---

3,386,777
AUXILIARY HYDRAULIC BRAKE LOCK
Fred W. Cords, Lake Crystal, Minn., assignor to Minnesota Automotive, Inc., Mankato, Minn., a corporation of Minnesota
Filed June 2, 1967, Ser. No. 643,115
11 Claims. (Cl. 303—89)

ABSTRACT OF THE DISCLOSURE

A brake lock for hydraulic brake systems and having a pair of sequentially operated valves for release of fluid pressure in a brake cylinder, a pressure control element for maintaining a predetermined fluid pressure in a brake cylinder, and a warning control device responsive to a predetermined pressure drop in a brake cylinder to initiate operation of an indicator therefor. A valve in the pressure control element is operative responsive to a predetermined increase of pressure in a brake cylinder, above a given operating pressure, to relieve the excessive fluid pressure in the brake cylinder.

---

Background of the invention

When parking an automotive vehicle, it is often desired to lock the same against accidental movement, such as when parking on an inclined road or the like, without mechanically locking the driving wheels of the vehicle to the power transmission thereof. Various types of hydraulic brake locking mechanisms have been heretofore introduced, such as those disclosed in United States Patents 2,345,280 and 2,964,141. The former discloses a brake locking mechanism involving electrical means for unlocking the same, the latter using mechanical means for the same purpose and involving a rather complex system of valves and accumulator mechanism for compensation of excess pressure in the brake system.

Summary of the invention

The present invention involves a highly compact unit which is relatively simple and inexpensive to produce, having a minimum of moving parts. A spring bias piston is axially movably mounted on a central core within a housing, and divides the interior of the housing into inlet and outlet chambers adapted to communicate respectively with a master cylinder and one or more brake cylinders of a hydraulic brake system. A pair of sequentially operated valves in the core are selectively manually and fluid pressure operable to control flow of fluid between the inlet and outlet chambers, the piston being movable against bias of the spring to cause the device to operate as an accumulator. A check valve in a passage through the piston is provided with valve opening means responsive to predetermined movement of the piston against bias of its spring to relieve pressure built up in the outlet chamber and brake cylinder beyond a given maximum pressure. Further, a warning control device is incorporated in the unit and adapted to be connected to a signal device or indicator, the warning control device being responsive to a predetermined pressure drop in the outlet chamber and brake cylinder to activate the signal device.

Referring to the accompanying drawings, which illustrate the invention, and in which like reference characters indicate like parts:

FIG. 1 is a view, partly diagrammatic and partly in side elevation of a hydraulic brake system for automotive vehicles, incorporating the present invention, some parts of the system being shown in section;

FIG. 2 is an enlarged view in front elevation of the hydraulic brake lock of this invention;

FIG. 3 is a view in rear elevation;

FIG. 4 is an enlarged fragmentary view partly in rear elevation and partly in section, taken substantially on the line 4—4 of FIG. 1;

FIG. 5 is an enlarged axial section taken substantially on the line 5—5 of FIG. 3, some parts being broken away;

FIG. 6 is a view corresponding to FIG. 5 but showing a different position of some of the parts;

FIG. 7 is a transverse section taken on the line 7—7 of FIG. 6, some parts being removed; and FIG. 8 is a view corresponding to a portion of FIG. 1, but showing a modified arrangement;

FIG. 9 is a fragmentary view partly in plan and partly in section, showing a modified control means for a single brake lock of this invention;

FIG. 10 is a transverse section taken on the line 10—10 of FIG. 9;

FIG. 11 is a transverse section taken on the line 11—11 of FIG. 9;

FIG. 12 is an axial section taken on the line 12—12 of FIG. 9; and

FIG. 13 is a view corresponding to a portion of FIG. 9 but illustrating a further modified control means arrangement.

A hydraulic brake system is illustrated in FIG. 1 as comprising, a conventional master cylinder 1 mounted on the fire wall 2 of an automotive vehicle and operated by a pedal-equipped brake lever 3, and front and rear wheel brakes 4 and 5 respectively, the master cylinder 1 being operatively connected to brake cylinders 6 and 7 associated with the brakes 4 and 5 respectively through a main conduit 8 and branch conduits 9 and 10. The above-described brake system is of a conventional and well-known type and, in and of itself, does not comprise the instant invention. Hence, further detailed showing and description thereof is omitted, in the interest of brevity.

The brake lock of this invention includes housing means comprising a cup-like main body 11 having a generally cylindrical wall 12, an end wall 13 and an open opposite end that is closed by an end cap member 14 rigidly but removably secured to the main body 11 by cap screws or the like 15. A generally cylindrical core 16 extends axially within the interior of the housing means and is formed to provide an axial stem or stud 17 that is screw threaded through an axial threaded opening 18 in the end cap member 14 and projects axially outwardly thereof. The stud 17 is adapted to extend through a suitable opening in any desired portion of the automotive vehicle, such as an instrument board or panel 19, and rigidly mounted thereon by means of a clevis or bracket 20 and a lock washer equipped clamping nut screw threaded on the stud 17 and operatively engaging opposite sides of the instrument panel 19.

The interior of the housing means is defined in part by a cylindrical wall surface 22 that is concentric with the core 16. A pressure control element in the nature of an annular piston 23 is mounted on the core 16 for axial sliding movements thereon, and engages the cylindrical wall surface 22. Sealing washers 24 and 25 are mounted in respective radially outwardly opening circumferential channels in the core 16 and piston 23 respectively, whereby sealing engagement is made between the core 16 and piston 23 and between the piston 23 and cylindrical wall surface 22. The piston 23 divides the interior of the house to an inlet chamber 26 and an outlet chamber 27, the chambers 26 and 27 being expansible and contractible responsive to axial movement of the piston 23. The core 16 is formed to provide an annular shoulder 28 that engages the piston 23 to limit axial movement thereof relative to the core 16 in an outlet chamber contracting direction.

Spring means, comprising a plurality of spring washers or the like 29, are interposed between the end cap member 14 and piston 23 within the inlet chamber 26, to yieldingly urge the piston 23 toward engagement with the shoulder 28, or in a direction to expand the inlet chamber 26 and contract the outlet chamber 27. The brake lock of this invention is adapted to be interposed in the main conduit 8, the main body 11 defining an inlet port 30 to the inlet chamber 26 and connected to that portion of the conduit 8 which leads to the master cylinder 1. The main body 11 further defines an outlet port 31 to the outlet chamber 27 and connected to that portion of the conduit 8 which leads to the brake cylinders 6 and 7 through the branch conduits 9 and 10 respectively.

The core 16 is formed to provide an axial opening 32 that extends for the entire length of the core 16 and its mounting stud 17, a portion of the opening 32 cooperating with a plurality of radial passages 33 in the core 16 to define fluid passage means between the inlet and outlet chambers. Adjacent the inner end of the core, the opening 32 is formed to provide an annular valve seat 34 that engages a primary valve element 35 that is loosely axially movable in the axial opening 32. The primary valve element 35 provides a valve seat for a secondary valve element 36 having an elongated axial stem 37 that extends loosely through an axial passage 38 in the primary valve element 35, the outer end of the stem 37 extending axially beyond the adjacent end of the primary valve element 35 when both said valve elements are in valve seated or closed positions, as shown in FIG. 5. The valve elements 35 and 36 are yieldingly urged toward valve closed positions by a coil compression spring 39 in the outlet chamber 27.

Means for unseating the primary and secondary valve elements 35 and 36 in sequence, against bias of the spring 39, comprises a valve operating piston element 40 that is axially slidably mounted in the opening 32 within the stud portion 17 and provided with a commercially available O-ring 41 that sealingly engages the wall of the opening 32. The piston element 40 has a reduced outer end in which is rigidly mounted a tip 42 that engages an eccentric or cam 43 journalled on a shaft 44 mounted in the bracket 20. The cam 43 is rotated by means of an operating handle 45 movable between an operative position shown in FIG. 5, wherein the valve elements 35 and 36 are moved to their seated or closed position by the spring 39, and an inoperative valve open position shown in FIG. 6.

It will be noted that, when the operating handle 45 is in its downwardly disposed inoperative position of FIG. 6, the inlet and outlet chambers 26 and 27 are in constant communication through that portion of the axial opening 32 which encompasses the valve element 35, both valve elements 35 and 36 being held open thus, the brakes 4 and 5 may be operated normally as if the cylinders 6 and 7 thereof were connected directly to the master cylinder 1. When it is desired to set the brakes 4 and 5 and lock the same in a brake set condition, the operating handle 45 is moved to its position of FIG. 5 to permit the spring 39 to close or seat the valve elements 36. Then, when braking pressure is applied to the brake lever 3, fluid pressure unseats the valves 35 and 36 against bias of the spring 39, the fluid pressure being applied through the outlet chamber 27 to the brake cylinders 6 and 7. Subsequent release of pressure on the brake lever 3 causes a pressure drop in the inlet chamber 26, whereupon the spring 39 closes or seats the valve elements 35 and 36, to maintain braking pressure within the outlet chamber 27 and brake cylinders 6 and 7. The brakes 4 and 5 will be thus held energized or set until the operating handle 45 is again moved to its inopertaive position of FIG. 6.

With reference to FIG. 5, it will be seen that, when the operating handle 45 is moved away from its operative position and toward its inoperative position of FIG. 6, initial inward movement of the valve operating piston 40 causes the secondary valve element 36 to be unseated before the piston 40 engages the adjacent end of the primary valve element 35. Thus, the transfer of pressure from the brake cylinders 6 and 7 and outlet chamber 27 to the inlet chamber 26 and master cylinder 1 is effected rather slowly only through the axial passage 38 in the primary valve element 35. Then, when the valve operating piston 40 engages the primary valve element 35 to unseat the same, fluid moves from the outlet chamber 27 through that portion of the axial opening 32 surrounding the valve element 35, to the inlet chamber 26. With this arrangement of sequentially opening valves, a sudden surge of pressure back to the master cylinder is avoided, minimizing shock loads on the working parts of the master cylinder and possible injury thereto.

The piston 23 under bias of the spring means 29 operates to compensate for variation in pressure of fluid in the outlet chamber 27 and brake cylinders 6 and 7, due to rise or fall of temperature in the brake system. When the brakes 4 and 5 are set in a hot condition such as due to relatively high ambient temperature and extensive use, and locked for a period of time permitting the same to cool, contraction of the working parts causes a pressure build-up in the outlet chamber 27. This pressure build-up causes the piston 23 to move in a direction against bias of the spring means 29 to expand the outlet chamber 27 and contract the inlet chamber 26 wherein only residual pressure resides. Thus, the housing means 11 and piston 23 operate as an accumulator for the fluid in the chamber 27 and brake cylinders 6 and 7. Under extreme operating conditions, and to prevent the springs 29 from collapsing under extreme movement of the piston 23, I provide a relief passage 46 that extends in a direction axially through the piston 23, the passage 46 being normally closed by a spring pressed ball check valve 47. A valve opening member 48 is mounted on the piston 23 within the inlet chamber 26, the member 48 preferably being made from spring steel or the like and having an inturned finger portion 49 extending into the passage 46 and normally spaced from the check valve 47. The member 48 is further provided with an out-turned finger 50 that engages the adjacent spring washer 29. Responsive to predetermined movement of the piston 23 in an inlet chamber contracting direction causes said adjacent spring washer 29 to move the valve opening member 48 in a direction toward engagement of the check valve 47 by the inturned finger portion 49 to unseat the check valve 47 and permit flow of fluid from the outlet chamber 27 to the inlet chamber 26. As the excess pressure in the outlet chamber 27 is relieved, the piston 23 will return sufficiently to permit the check valve 47 to close, whereby to maintain a correct operating pressure within the outlet chamber 27.

For the purpose of providing an audible or visual indication as to the operating condition of the brake system when the brake lock is operative, I provide a warning control device in the nature of a normally closed switch indicated in its entirety by the reference numeral 51. The switch 51 comprises a pair of laterally spaced terminal strips 52 and abridging contact element 53 movable toward and away from bridging contact with the terminal strips 52. The switch 51 includes a cup-shaped cap element 54 that is bolted or otherwise rigidly secured to the end wall 13 of the main body 11, an insulator plate 55 interposed between the terminal strips 52 and the adjacent surface of the end wall 13, an insulator grommet 56 in which the bridging contact 53 is axially movable, an adjustment screw 57 that is axially screw threaded in the cap element 54 and spring means comprising a plurality of spring washers 58 interposed between the adjustment screw 57 and the bridging contact 53 and insulated from the contact 53. The spring washers 58 bias the bridging contact 53 toward switch closing engagement with the terminal strips 52. A switch actuator piston 59 is axially slidably movable in an opening in the end wall 13 in axial alignment with the valve elements 35 and 36, the piston 59 having an insulated outer end engageable with the bridging contact 53 and an inner end portion slidably encompassing the adjacent end portion of the valve stem 37 and engageable with the secondary valve 36. The switch actuating piston is axially movable to open the switch 51 against bias of the spring washers 58 either by engagement with the secondary valve 36 or by fluid pressure within the outlet chamber 27. For the purpose of the present example, and as shown in FIG. 1, the switch 51 is interposed in a grounded circuit including a battery 60 and a signal such as a buzzer or lamp, indicated diagrammatically at 61.

When the brake lock of this invention is disposed in its inoperative condition as shown in FIG. 6, the opened secondary valve 36 engages the actuator piston to open the switch 51 and maintain the same in open condition. When the operating handle 45 is moved to its operative position of FIG. 5, the spring 39 moves the primary and secondary valves to their closed position, whereupon the spring washers 58 operate to close the switch 51 to energize the indicator to warn the operator that the brakes are not applied. Then, when the brakes are applied, fluid pressure in the outlet chamber 27 will move the switch actuator piston 59 to open the switch 51 against bias of the spring washers 58, to deenergize the indicator 61. Thereafter, if pressure within the brake cylinders and chamber 27 falls below a predetermined pressure, the switch 51 will close to warn the operator of the pressure drop. The pressure at which the switch closes may be controlled by loosening or tightening the adjustment screw 57 to increase or decrease bias of the spring washers 58.

In view of the fact that, in a preferred installation, the brake lock of this invention is located above the level of the master cylinder 1, the housing body 11 is provided with a fitting 62 communicating with the upper portion of the inlet chamber 26, and a conventional bleeder valve 63 connected to the fitting 62, whereby air may be bled from the system when required.

In the modified arrangement illustrated in FIG. 8, I provide a pair of cooperating brake locks of the type above described, these being identified as 64 and 65 and mounted in opposed axially aligned relationship in a generally U-shaped mounting member 66. The brake locks 64 and 65 are arranged to be operated simultaneously by a single operating handle 67 mounted on a shaft 68 journalled in the mounting member 66 and on which is rigidly mounted an operating cam 69 which performs the same function as the cam 43. This arrangement is utilized for dual brake systems, one of the brake locks 64 or 65 being operatively coupled to the front brakes of a vehicle, the other brake lock being operatively coupled to the rear brakes.

In the modified arrangement illustrated in FIGS. 9–12, the stud 17 is screw threaded into one end of a generally rectangular body 70, as indicated at 71, the body 70 having a passage 72 therein axially aligned with the passage in the stud 17 and which receives the outer end portion of the valve operating piston element 40. The body 70 is mounted on an L-shaped bracket 73 having an opening for reception of the stud 17, the bracket 73 being clamped between the body 70 and the washer equipped clamping nut 21. The bracket 73 is mounted on the panel 19 by a pair of clamping nuts 74 and 75 that are screw threaded on a hollow threaded stem 76 that extends through aligned openings in the bracket 73 and panel 19.

The body 70 defines a second passage 77 that is normal to and intersects the passage 72 and which is counterbored to receive a tubular mounting shank 78 to the outer end of which is rigidly mounted the housing 79 of a fluid pressure operated motor 80. The motor 80 further includes a diaphragm 81 to which is secured a plunger rod 82 axially movable through the tubular shank 78 and in the passage 77. The inner end of the plunger rod 82 is formed to provide a conical cam surface 83 which operatively engages the tip 42 of the piston element 40 through the medium of a ball 84 loosely received in the passage 72.

Operation of the motor 80 is controlled by a valve 85 comprising a generally cylindrical body portion 86 integrally formed with and concentric with the tubular stem 76, an end member 87 and a rotary valve element 88 in the body member 86 and having a valve stem 89 extending axially through the tubular stem 76 and to the outer end of which is mounted a control knob or the like 90.

The valve element 88 is formed to provide a pair of diametrically opposed arcuate grooves 91 and 92 that are selectively registrable with given pairs of circumferentially spaced ports, 93, 94 and 95 in the end member 87. The ports 93 and 95 are operatively connected to the motor housing 79 at opposite sides of the diaphragm 81 by respective conduits 96 and 97, a third conduit 98 extends from the port 94 and, for the purpose of the present example, is connected to a suitable source of pressure below atmospheric pressure such as the intake manifold of the vehicle engine, not shown. The valve element 88 is formed to provide an opening 99 that extends axially therethrough from end of the arcuate groove 92 and communicates with atmosphere through a pair of axially extended openings 100 in the valve body member 86.

With the valve element 88 positioned as shown in FIGS. 11 and 12, and with sub-atmospheric pressure or partial vacuum applied to the conduit 98, the diaphragm 81 moves to its position shown in FIG. 9 whereby to render the brake lock operative. Rotation of the valve element 88 in a counterclockwise direction with respect to FIG. 11 to the extent of substantially 90°, will cause the diaphragm 81 to move toward the body 70, whereupon engagement of the ball 84 by the cam surface 83 will move the valve operating element 40 in a direction to place the brake lock in condition for normal operation of the vehicle brakes.

One advantage of the control means illustrated in FIGS. 9–12 lies in the fact that the vehicle brakes cannot be unlocked unless the vehicle engine is running. Thus, anyone wishing to push or tow the vehicle away for the purpose of stealing the same will find it almost impossible to do so, when the brakes are locked.

The form of control means illustrated in FIG. 13 is similar to that shown in FIG. 9 but is adapted for use with a pair of brake locks in the manner illustrated in FIG. 8. A body 101, similar to the body 70 is formed to provide a passage 102 that extends therethrough and is provided at its opposite end portions with diametrically enlarged screw threaded counterbores 103 for reception of the threaded ends of opposed studs 17. Washer equipped nuts 21 on the studs 17 are used to mount the body 101 on a generally U-shaped mounting bracket 104 having an aperture 105 by means of which the bracket 104 is mounted on an instrument panel in the same manner as the bracket 73. The body 101 is formed to provide a second passage 106 normal to and intersecting the passage 102 intermediate its ends, the passage 106 being counterbored to receive the tubular shank 78 with its plunger rod 82. As shown, the body 101 is provided with a pair of cam follower balls 84 at diametrically opposite sides of the plunger rod 82 and each engaging an adjacent one of the valve operating elements 40. Thus, a single plunger rod 82 may be used to control operation of a pair of brake locks of the type above described, one of the brake locks being used in connection with the brakes of the front vehicle wheels, the other thereof being used to control the brakes of the rear wheels.

By providing a central core within a housing and an annular piston, together with sequentially operated valves in the central core, as above described, it is possible to produce a brake lock and accumulator that is exceedingly compact and which can be installed conveniently to the operator in locations where space is limited, and where the unit itself is hidden from the casual observer.

While I have shown and described a commercial embodiment of my brake lock, it will be understood that the same is capable of modification without departure from the spirit and scope of the invention, as defined in the claims.

What is claimed is:
1. An auxiliary hydraulic brake lock comprising:
   (a) housing means having a generally cylindrical interior including a cylindrical wall surface and a core extending axially of said interior;
   (b) an annular pressure control element encompassing said core and dividing said interior into inlet and outlet chambers, said pressure control element being axially movable in opposite directions to expand each of said chambers while contracting the other of said chambers simultaneously;
   (c) yielding means urging said pressure control element in a direction to expand said inlet chamber and contract said outlet chamber;
   (d) said housing means defining an inlet port to said inlet chamber and adapted to be connected to the master cylinder of a hydraulic brake system, and an outlet port to said outlet chamber and adapted to be connected to a brake cylinder;
   (e) said core having passage means including an axial passage therethrough establishing communication between said inlet and outlet chambers, and defining a primary valve seat;
   (f) a primary valve element axially movable in said axial passage toward and away from seating engagement with said primary valve seat, said primary valve element having an axial passage therethrough and defining a secondary valve seat;
   (g) a secondary valve element having a portion extending axially through the axial passage of said primary valve element, said secondary valve element being movable away from seating engagement with said secondary valve seat;
   (h) yielding means urging said valve elements toward seating engagement with their respective valve seats;
   (i) control means including a valve operating element movable in said axial passage to unseat said secondary and primary valve elements in succession against bias of said last-mentioned yielding means;
   (j) a warning control device mounted in said housing means and adapted to be connected to warning apparatus to indicate a given drop in pressure in said secondary chamber;
   (k) and an actuator for said warning control device mounted in said housing means for movement toward and away from said control device, said actuator being disposed to be moved in one direction by one of said valve elements and selectively by fluid under pressure in said secondary chamber.

2. The brake lock defined in claim 1 in which said actuator comprises a piston axially aligned with said valve elements, said secondary valve element having a portion engaging said piston during valve opening movement of said secondary valve element, to move said piston toward operative engagement with said control device.

3. The brake lock defined in claim 2 in which said control device comprises a switch, characterized by spring means biasing said switch toward a switch closed position, said actuator being operable to open said switch against bias of said spring means.

4. The brake lock defined in claim 1 characterized by a hollow mounting stud extending axially from said housing means, and a chair of cooperating clamping elements on said stud, one of said clamping elements comprising a bracket, said valve operating element being axially movable in said mounting stud, said control means including a cam journalled in said bracket and operatively engaging said valve operating element.

5. The brake lock defined in claim 4 in which said mounting stud is integrally formed with said core, said housing means including a cup-like main body member and a cap member having a central opening therethrough, said stud extending outwardly through said central opening.

6. The brake lock defined in claim 1, characterized by means including a pressure relief valve in said pressure control element and operative responsive to predetermined movement of said pressure control element in one direction to establish communication between said primary and secondary chambers independently of said primary and secondary valve elements.

7. The brake lock defined in claim 1 in which said pressure control element comprises a rigid annular piston having axial sliding engagement with said core and said cylindrical wall surface, characterized by a stop element on said core limiting axial movement of said piston in the direction thereof urged by said first-mentioned yielding means.

8. The brake lock defined in claim 1 in which the yielding means associated with said piston comprises an axially expandable and compressible spring, further characterized by:
   (a) a fluid passage through said piston;
   (b) a check valve in said fluid passage and normally operable to admit flow of fluid from said primary chamber to said secondary chamber;
   (c) and a check valve opening member mounted on said piston and engaging a portion of said spring responsive to predetermined movement of said piston against bias of said spring to open said check valve.

9. The brake lock defined in claim 1 in which said control means includes a fluid pressure responsive member operatively associated with said valve operating element and movable in one direction to impart valve unseating movement to said valve operating element and in the opposite direction to release said valve operating element for movement in a valve releasing direction, a fluid pressure operated motor for said member, and a fluid pressure circuit including a control valve for said fluid pressure operated motor.

10. The brake lock defined in claim 1 characterized by a hollow mounting stud extending axially from said housing means, a control body mounted on said stud and defining a passage axially aligned with said stud, said valve operating element having an outer end axially movable in said passage, said body further defining a second passage angularly displaced from and intersecting said first-mentioned passage, a motor mounted on said body and including a plunger rod axially movable in said second passage, said plunger rod having a cam surface operatively associated with said outer end of the valve operating element, whereby axial movement of said plunger rod imparts axial movement to said valve operating element, and circuit means including a control element for said motor.

11. The brake lock defined in claim 10 in which said first mentioned passage extends through said control body, said body being adapted to receive a second brake lock mounting stud having an independent valve operating element receivable in said first mentioned passage in spaced relation to said first mentioned valve operating element, said plunger rod cam surface being operatively associated with the inner ends of both of said valve operating elements to impart axial movements to said valve operating elements simultaneously.

References Cited

UNITED STATES PATENTS 2,886,060  5/1959  Highland et al. _____ 188—152
2,964,141  12/1960  Schlumbrecht _____ 188—152

DUANE A. REGER, *Primary Examiner.*

J. J. McLAUGHLIN, *Assistant Examiner.*